Jan. 13, 1942.  W. J. MILLER  2,270,075
METHOD AND APPARATUS FOR MANUFACTURING POTTERY WARE
Filed Nov. 12, 1938  2 Sheets-Sheet 2
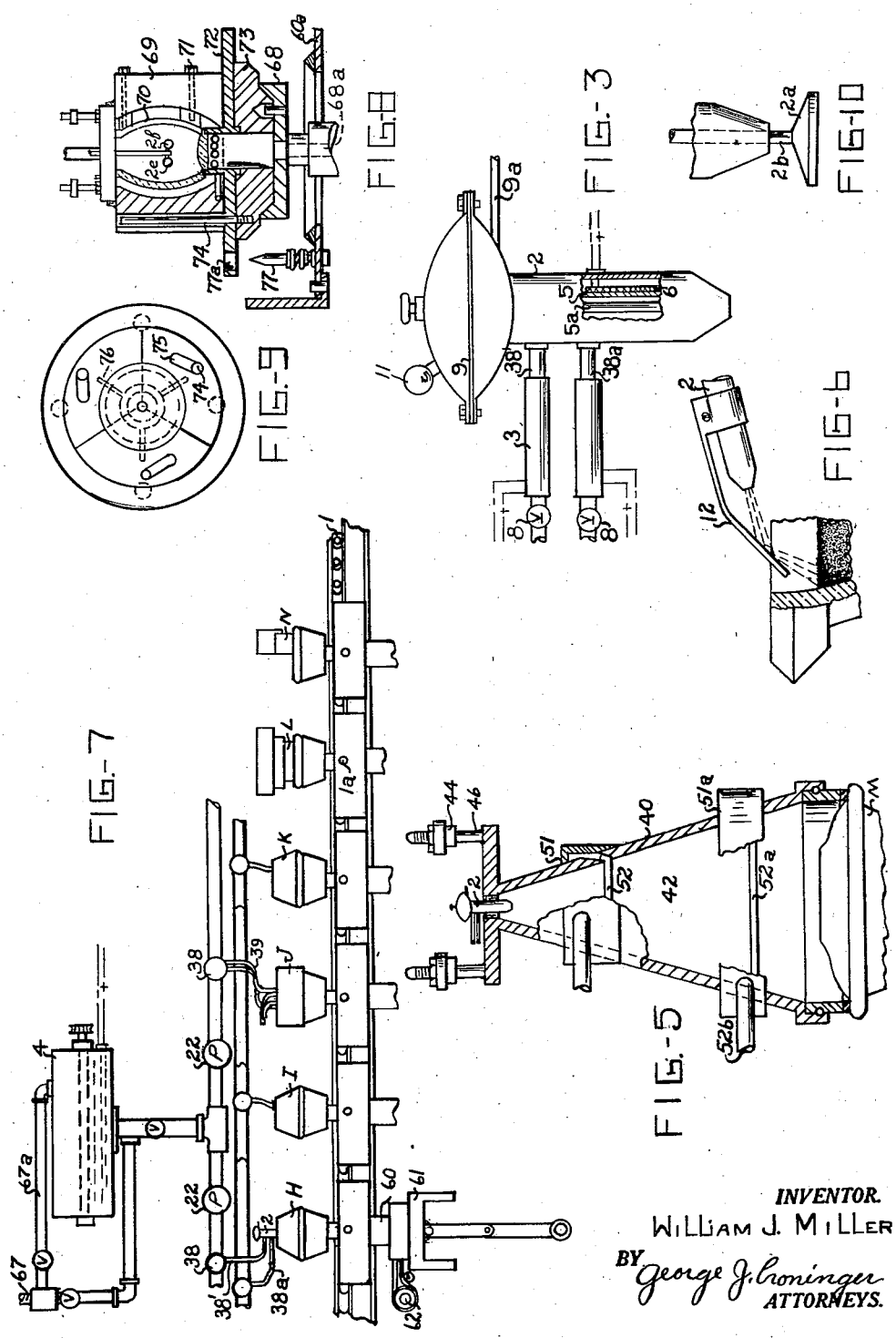
INVENTOR.
William J. Miller
BY George J. Croninger
ATTORNEYS.

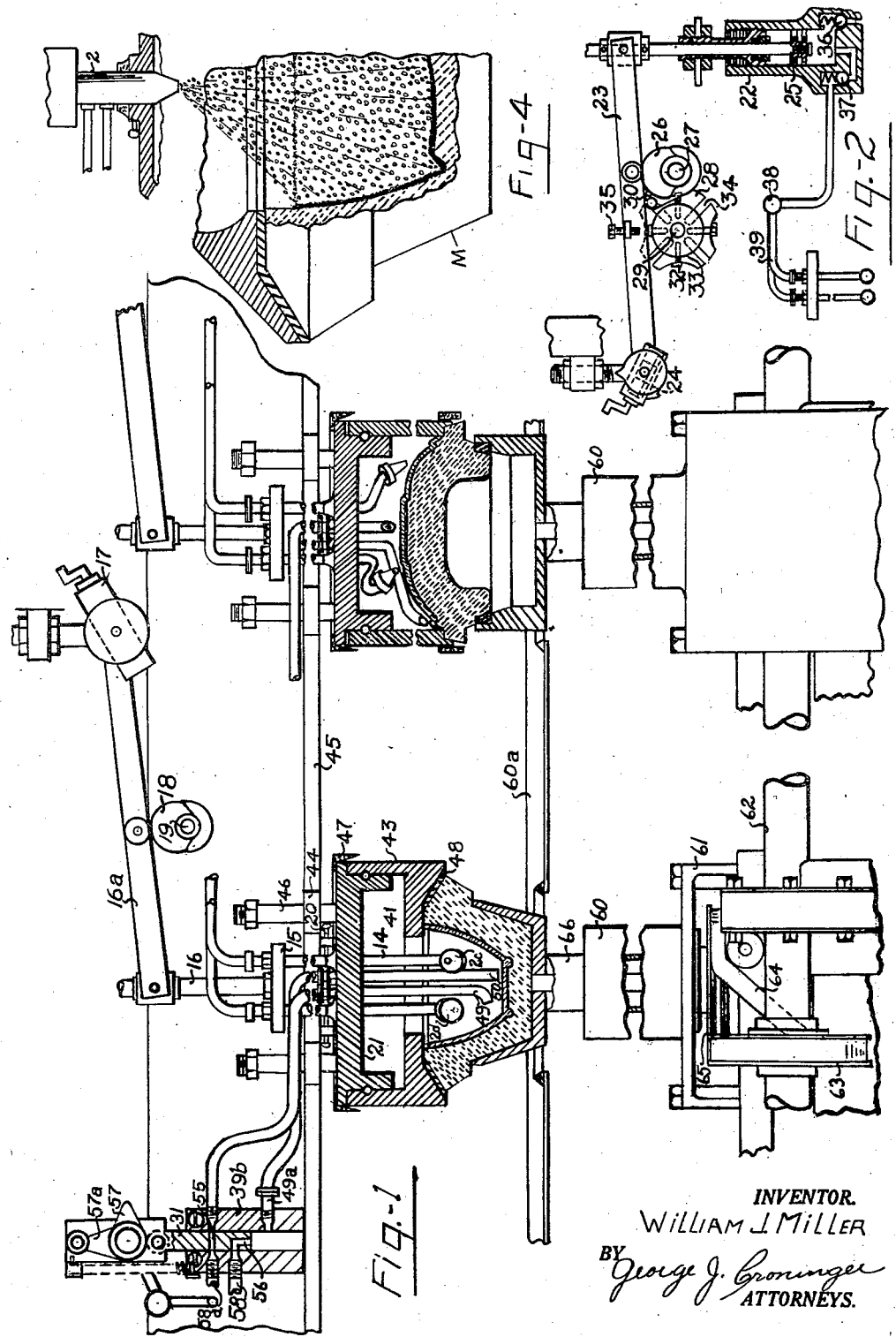

Patented Jan. 13, 1942

2,270,075

UNITED STATES PATENT OFFICE 2,270,075

METHOD AND APPARATUS FOR MANUFACTURING POTTERY WARE

William J. Miller, Swissvale, Pa.

Application November 12, 1938, Serial No. 239,972

23 Claims. (Cl. 25—22)

This invention relates to the forming and drying of pottery-ware. It has to do with methods and apparatus for applying clay to molds and separating solid constituents of the ceramic mixture from liquid or vaporizable constituents in the manufacture of the body of the article.

According to conventional methods, pottery ware of the class herein described may either be slip cast or jiggered. In the case of slip casting, a fluid mixture of ceramic ingredients is introduced into a mold of the desired contour and permitted to set until a precipitation of the desired depth has been made on the walls of the molding cavity. The excess fluid is decanted, the mold opened and the article removed. In jiggering, a plastic mass of ceramic materials is applied to the mold in the form of a bat which is operated upon with various forming tools and then dried. Upon drying, the ware releases from the mold and may be thereafter finished, glazed and fired.

As distinguished from such conventional practices, this invention contemplates forming the ware by one or more applications of a ceramic mixture in divided adhesive form to the molding surface of a mold, as by spraying from a point or points removed from the surface, the molecules bonding to the mold and to each other by natural adhesion and/or by the force of impact to thereby progressively build up a clay deposit in the form of a partly or wholly contoured body having at least an approximation of final ware form separable from the mold upon sufficient dissipation of the adhesive factor and ready for such finishing steps as may be required. The operation may be accompanied by enforced vaporization of liquid or vaporizable constituents of the mixture as by spray drying in the presence of heat and may be followed by such operations as sponging, finishing, appendaging, glaze application and firing, the object being to simplify clay preparation, application and forming work and to render production substantially automatic in the manufacture of the commercial product.

The method does away with filter presses, pug mills, storage tanks, etc. and greatly reduces mold equipment, floor space and personnel required heretofore. Moreover, a de-airing effect is obtained which renders the deposit more dense, and warping during firing is eliminated due to uniform density, homogeneous texture and the absence of seams, laps and air bubbles. By my method the wall thickness of the product may be controlled zonally and the exposed contour such as the brim or foot of the ware definitely established. Furthermore, I provide for depositing the clay on the mold in varying degrees of dehydration ranging from a low moisture content body or dust suitable for dry pressing to a stable plastic such as used in jiggering, and since the time required for the product to dry to the point of removal from the mold generally depends on the amount of moisture remaining in the particles at the time of deposit and the rapidity with which such remaining portion is abstracted, I provide suitable controls for these factors to apply appropriate conditions for best commercial practice.

In the drawings, Fig. 1 is a view partly in section of hollowware and flatware spray mechanism together with operating means therefor, as incorporated in a mass production machine.

Fig. 2 is a detail view of the charge forming mechanism with the slip pump shown in section.

Fig. 3 is an elevation of a spray nozzle with certain of the parts broken away to illustrate internal mechanism.

Fig. 4 is a detail showing a hollowware mold partly broken away and spray evaporation apparatus and illustrating the operation of recovering a deposit of clay on the molding surface in the form of a hollowware body, for instance a cup.

Fig. 5 is a view showing a flatware mold and a spray evaporation apparatus and hood used in recovering the clay in the form of flatware bodies, for instance plates, on the mold.

Fig. 6 is a fragmentary detail illustrating the operation of building up and defining certain zones of the article undergoing production, for instance the brim zone of a hollow article as shown.

Fig. 7 is an elevation showing in a diagrammatic way the apparatus and operations sequence in a mass line production system featuring my spray evaporation process.

Fig. 8 is a sectional elevation of a partible hollowware mold and mechanism for automatically elevating, opening and closing the same together with spray mechanism.

Fig. 9 is a top plan view of the mold and spray mechanism of Fig. 8.

Fig. 10 is an elevation of a centrifugal spray mechanism.

I have shown in Fig. 1 a mass producing machine on which my method may be practiced which has provisions for making hollowware and flatware simultaneously according to the line production principles laid down in my Patent No.

2,046,525, this being better illustrated in Fig. 7 wherein various stations are arranged in successive order adjacent a mold carrier 1 where various operations in the manufacture of the ware are performed.

The equipment consists first essentially in a clay applying device, preferably a regulatable means that will throw anywhere from a solid jet to a flat or round open or closed spray and is adjustable for fineness of spray, volume and position and will not drip. Examples of a nozzle including these characteristics is shown diagrammatically in Fig. 1 and more specifically in the adjustable lift valve 2 of Fig. 3. Also, in Fig. 10 is shown a centrifugal spray mechanism for wide distribution and impact spraying, the rotor 2a being suspended below the nozzle orifice by a rotatable stem 2b.

The ceramic mixture, which may be either a fluid mixture, a plastic or a dust mixture, is pressure conducted from a supply source to the applying nozzle 2 in valved supply conduit 38' provided with a heating means 3 auxiliary to a heating means in tank 4, Fig. 7. The needle conduit 5 is also jacketed with a heating means 6. Gases or liquids heated or otherwise, or solids such as electrolytes, purposeful in treating and conditioning the clay, may be supplied through conduit 38a and mixed with the clay. Conduit 38a may also be utilized as a pressure source to eject and propel the clay from the nozzle 2. Other uses are, dust may be treated with live steam to increase the moisture content of the particles and thus render them sufficiently adhesive for bonding to the mold, or previously deposited clay. Compressed air may be utilized to atomize and transport the mixture, particularly in the case of viscous fluids and plastics. The valve 8 provides one means for regulation of feed.

The valve closure 5a is preferably opened by valve controlled fluid pressure, preferably a liquid, pressing against a diaphragm 9 and closed by a spring. Universal mounting is through ball 11. The baffle 12, Fig. 6, is for limiting one edge or concentrating the application, as in building up a foot or for limiting the height of the brim and localizing the spread.

A nozzle or nozzles embodying these characteristics may be utilized at any spray station, for instance, the nozzle 2 may be utilized with the hood 40 of Fig. 5 in spray evaporating the fluid mixture, this arrangement being preferably employed in making an initial deposition of clay in producing flatware, the arrangement for hollowware being shown in Fig. 4 and the arrangement for hollowware of the type usually made by casting being shown in Fig. 8. In the latter instance, two spray heads 2e and 2f (shown diagrammatically) are preferred because of the wide area of distribution and additional heads may be utilized if found practical.

Another arrangement is shown in Fig. 1 which enables vertical reciprocation and various adjustments of the spray head, these being advantageous features in connection with the making of secondary applications and building up thickened zones, etc. It is understood, however, that such arrangement may be utilized for primary application work but is shown as being operated in the application of additional clay to a fresh deposit, that is to say, a certain precentage of the body may be deposited as by the spray apparatus of Fig. 3 or 4 and the remainder applied by the mechanism of Fig. 1.

The nozzles 2c and 2d of Fig. 1, which embody features already described, although they are shown diagrammatically, are each mounted on a clay supply pipe 14 and 14a respectively, the pipes being attached to a plate 15.

Pipe 14, Fig. 1, and a nozzle 2c are suspended from plate 15 which is raised and lowered by a rod 16 and lever 16a having an adjustable fulcrum 17 by means of which the extent and altitude of nozzle travel may be varied. The lever is actuated by cam 18 adjustably secured to shaft 19 which is driven by and synchronized with the machine. To secure the nozzle in fixed position to obtain definite and uniform nozzle penetration into the molding cavity, the lever 16a may be disconnected and the screws 20 tightened, thereby securing the nozzle to base 21.

In delivering ceramic material to the nozzles 2c and 2d or nozzles 2, Figs. 3 and 4 or 2e and 2f, Fig. 8, a pump 22 having a lever 23 adjustably fulcrumed at 24 is provided to thereby vary the throw of lever 23 and plunger 25 and predetermine the volume of material contained in any one or more charges. A cam 26 adjustably secured to shaft 27 actuates lever 23. To feed non-uniform charges in succession to one or a succession of molds, a reduction gear such as a Geneva wheel 28 is secured on shaft 29 and a motion plate 30 is mounted on cam shaft 27. Adjustable stop screws 32 are threaded into the periphery of a disc 33 and correspond in number to the slots 34. A further stop screw 35 is adjustably threaded in lever 23 which contacts with screws 32 to limit down travel of lever 23. By adjusting screws 32, one stroke of the charge plunger in a series may be varied independent of throw extent of cam 26 and by adjusting screw 35 the complete cycle of strokes may be varied. This apparatus is fully described in my Patent #1,838,277.

During the intake stroke of the plunger 25, the material is drawn through a check valve 36 into the pump cylinder and during the discharge stroke, the check valve is closed and the material is forced under pressure through check valve 37 into a header 38 having flexible branches 39 leading to the nozzles. This apparatus, devoid of checks 36 and 37, may be connected through conduit 9a to lift diaphragm (not shown) and needle 5a varying distances, thus applying succession varying volume charges, each being adjustable. Shaft 27 may be rotated one-half revolution, a full revolution or a multiple of revolutions in each cycle to determine frequency of clay application.

The delivery of the mixture from the nozzle to the mold preferably takes place in a closed chamber. The chamber prevents promiscuous dispersion of the spray and facilitates controlling the atmosphere under which clay application is effected. In Fig. 1, the chamber 41 is formed by the head 21 and the mold.

In Fig. 1 (left hand side), the hollowware head comprises an open center flanged ring 43 rotatably mounted on a base 21 so that the lower half may rotate with the mold M. The assembled unit is slidably supported from the lintel 45 of the fabricating machine by studs 46 in guides 44 so that only the weight of the head rests on the mold When in co-operation with the mold, a sealed chamber 41 is formed, a gasket 47 sealing the line of juncture of the head and base and a gasket seal 48 between the head and mold. All of the pipes entering the head are sealed around the head orifices. The chamber 41 preferably is vacuumized to accelerate the evolvement and withdrawal of vapour, also heated air or other treating fluids may be introduced into the chamber or directed to particular zones of the mold. Pipe 49 serves to exhaust the pipe 50 to introduce said fluid. The pipes are adjustable vertically and radially for spot concentration of the air stream to locally control the rate of drying. While it is contemplated that no unstable mixture will flow to a lower or outer position on the mold or clay wall, in case it does, part or all may be withdrawn by suction pipe 49. The flatware head shown at the right, Fig. 1, is substantially the same as the hollowware head, except for obvious variations in construction to accommodate the said apparatus for flatware work.

A valve 39b, substantially the same as that shown and described in my Patent #2,046,525, may be utilized in timing and controlling suction and air input and comprises generally a plunger 31, Fig. 1, with ports 55 and 56 and adjustable dwell and position cams 57 and 57a for alternately connecting and closing vacuum source conduit 58 with conduit 49a and air source conduit 58a with conduit 49.

In Fig. 5, the head 40 is shown in the form of a frustum of a cone and a spray nozzle 2 centered and sealed in the neck. This arrangement may be utilized for spray evaporation work and the area of the chamber 42 is enlarged to permit bringing the material, in a state of suitable subdivisions, in contact with an appreciable volume of gaseous drying medium at a temperature sufficient to effect removal of liquid, the solid constituents being confined and recoverable on the molding surface of the mold M. Means are provided for circulating gas in the drying chamber consisting of a circular conduit 51 with downwardly biased outlets 52. Conduit 51a with outlet 52a may be utilized for exhaust purposes in which case preferably pipe 52b would lead to a separator for the reclamation of minute solids borne off in the air stream or a drying medium may be introduced through this conduit. By means of this head, a longer travel is given the material between point of atomization and the point of deposit enabling the use of lower gravity and temperature slip.

In a mass production machine, the molds may be transported to the fabricating units on open bottom trays 60a pivotally connected by trunnions 1a above their center of gravity at spaced intervals to an endless chain conveyor 1, which is intermittently advanced and halted. The chuck units 60 are adjustably mounted on an elevatable crosshead 61, Fig. 7, and upon elevation thereof the molds are centered, picked up and elevated into co-operation with the various fabricating units by the chucks 60. As the mold approaches the limit of elevation, shaft 62, Fig. 1, is clutched to a source of power and the mold at the spray station is rotated coincident with the delivery of material thereto from the nozzle through drive sheave connections 63, belt 64, sheave 65 and spindle 66. Thereafter, the crosshead lowers, rotation ceases and the mold is redeposited on the conveyor and the cycle repeated. It is understood that the mold may remain stationary and the nozzle rotated relative thereto or the nozzle and mold rotated relatively to obtain optimum distribution of the material.

In commercial mass production, I prefer that a series of coats be deposited in succession with intermediate drying intervals until the appropriate stable wall thickness is built up, however, one application may suffice.

In making ware from a fluid mixture of ceramic materials by my method, I prefer that the materials are first pulverized and then mixed with water and electrolytes are then pumped directly into the main delivery line 67 or by-passed through valved line 67a into an agitating preheating tank 4, Fig. 7, thus reducing apparatus requirements and preventing intermediate settling of the solids. I also prefer to reduce the water content required to the least proportion adapted to practical spraying.

The optimum temperature at which the slip is sprayed is dependent upon the degree of vaporization desired within a particular station or stage in the procedure. For instance, when a wet mix is employed, it is preferred that coincident with travel of the material from the nozzle and prior to deposition on the wall that a considerable percentage of the liquid constituents be vaporized and driven off and therefore the initial spraying operation is preferably conducted with extended travel between nozzle and deposit wall as shown in Fig. 4 with rotation of the mold relative to the spray and the molding cavity vacuumized as well as a high temperature slip employed to convert the slip into at least a semi-rigid, homogeneous, stable deposit of sufficiently low plasticity to adhere to and remain stable on the mold or clay surface. The thickness of the deposit depends upon the volume of material sprayed and the time interval allowed for spraying.

The mold, preferably being absorbent, coincidentally absorbs the moisture from the clay deposited thereon and the exposed clay surface also continues to expel vapor. If desired, high temperature air may be circulated over the exposed surface of the clay to absorb and convey away moisture.

Assuming that only an initial application has been made and that it is desired to apply additional material as in building up a particular zone or zones and in defining brims, feet, etc., the next application may be concentrated on particular zones or areas as illustrated in Fig. 1. Here, a considerable deposit has been already accumulated on the mold but it is desired to build up the foot of the flatware article and the brims of both articles, then the nozzle shown in Fig. 6 is preferably utilized, the baffle serving to locate and concentrate the material in the desired zone or zones. To obtain rapid solidification of the solid constituents, the slip may be conducted to these nozzles under a higher degree of super heat or the temperature conditions within the chamber may be increased over those at the primary station or a higher degree of vacuum may be utilized.

The conditions of temperature and pressure at which the slip is deposited on the mold at any one station is dependent upon such factors as the percentage of water in the slip, the degree of water extraction desired within a given time interval or within a given distance of travel between the nozzle orifice and the deposition point and these matters are controllable through regulation of the temperature of the slip, the pressure thereon, the temperature in the molding cavity or spray chamber as well as the atmospheric pressure therein.

The material may be delivered at any station from one or more jets, depending primarily upon the area of the molding surface, the capacity of the spray nozzle, the diffusion range thereof and the time interval allotted for deposition. For instance, in the case of the hollowware mold of Fig. 1, two jets 2c and 2d are provided, turned in opposite directions, one up and one down on either side of the axis of rotation of the mold. The left hand nozzle would serve to increase the amount of material needed to bring the foot up to the desired thickness because the primary deposit (see Fig. 4) would ordinarily not entirely fill this area which in the final product is of greater thickness than the bottom and side wall portions. The spray nozzle 2c on the right, being directed upwardly or downwardly as in Fig. 6 and provided with a baffle would define the brim. If additional overall thickness is required, then this could be accomplished at another station or by reciprocating the nozzles shown or varying the angularity thereof or the spread of the spray. The jets may also be moved radially or longitudinally to obtain a uniform or varied wall thickness. The elevating provision for the slip jets will enable this and also will enable a predetermined dwell at any predetermined point during the spray coating cycle. To vary the distance between jet orifice and deposit wall in hollowware molds, the jet stem may be positioned eccentric of the mold and the distance varied by rotating this stem. Vertical distance variation is obtained through apparatus shown in Fig. 1.

The molding chamber may be vacuumized incident to the spraying operation to thereby accelerate the release of vapor and in any spraying or drying operation to de-air the clay. The speed of impact of the globules against the wall of the mold compacts the solids in the body of the article undergoing production and avoids porosity and air entrapment, especially if conducted under vacuum. Vacuum may also be applied to the mold before deposition of the clay to thereby clean and open the pores and remove occluded air. By establishing a rarefied atmospheric condition in the pores of the mold body adjacent the molding surface, better adhesion is promoted between the clay and mold as well as sufficient and instantaneous commencement of capillary action.

To illustrate how my method may be incorporated in a straight line mass production machine, I have shown in Fig. 7 an arrangement wherein the mold is given a first coating at H and is then transported on the conveyor 1 to a hot air application head I for additional dehydration, then transported to station J wherein additional deposit is applied and/or zone of greater cross section built up, then moved to station K for further buildup or drying and additional stations added as required.

To recontour the exposed wall, a die is mounted at L and/or a profile at N, as taught in my United States patent application #Re. 20,401, and thereafter advanced through further treating stations and progressed through a dryer, then further embellished at subsequent stations as required.

For spraying a dry mixture congenial for dry pressing, the materials are pulverized and treated, then conducted under pressure to the nozzles and there moistened with water or steam to promote sufficient adhesiveness for bonding it together and to a metal or reinforced porous mold upon deposition.

The particles are propelled at sufficient velocity against the surface to produce ample force to effect optimum adhesion and amalgamation. The shape thus produced may be the completed article or may be die pressed and/or profiled to complete it.

A plastic mix may be sprayed by this method in which case the conditions of temperature and pressure and degree of atomization could be made congenial to the most practical method of application.

Thus, if the material is sprayed as a fluid mixture, a greater amount of dehydration may be required to condition the deposit for processing as by die pressing or profiling, however, if sprayed on as a plastic, less dehydration will be required, and if sprayed as a conventional dry mix, then little or no further dehydration may be needed before die compacting and finishing. Therefore, my method encompasses the reduction of a fluid mixture to a plastic or to a dry deposit, and a plastic to a dry deposit and also raising the plasticity of a dry mix coincidental with application to a molding surface.

In the manufacture of irregular or restricted mouth bulbous ware (see Fig. 8), I prefer to utilize partible molds such as shown in Fig. 8 and in my United States Patent #1,898,561.

The mold is opened and closed through angular motion of the supporting chuck 68. The multiple section metal mold case 69 and mold sections 70, which preferably are of porous material, are secured together by screws 71. The sections are shiftably mounted on base 72 which is rotatably mounted on a main base 73. Dowels 74 are secured in the main base and project upwardly through arcuate slots formed in the base 72 and into tangential slots 75 formed in sections 69. These sections are guided radially by pins 76 secured in the hub of the base 72 and project into oversize radial bores formed in said sections.

A dowel pin 77 secured in tray 60a enters a bore 77a formed in the mold base 72 when it is lowered onto the tray. To open the mold, the chuck is caused to rise and elevate the mold clear of the tray but not clear of the pin 77 and then rotate counter-clockwise, which action shifts the locking dowels 74 in the slots 75 and parts the mold sections to permit removal of the ware. The molds are preferably gripped to the chuck by suction periodically introduced through a bore in the chuck spindle. Rotation of mold during spray application may be effected when clear of dowel 77. The clearance between the outer and the inner mold sections provides air circulation space which may be connected with a source of vacuum or pressure. Free or forced circulation of air around the mold proper is thereby possible.

The spray apparatus is substantially the same as that heretofore shown and described and since ware of this class is apt to be relatively large, then more than one spray nozzle may be utilized if desired to insure proper distribution of the mixture. It should be noted that the molds are preferably gripped to the chuck by suction introduced through a bore 68a in the hollow chuck spindle which is the preferred manner of gripping both the hollowware and flatware molds of Fig. 1 to their relative chucks.

Circulation of air around the inner mold portion facilitates the extraction of moisture from the absorbent mold portion.

The body of the article whether flatware or hollowware as it is recovered on the mold is not entirely dehydrated in the case of ware which is to be finished as by jiggering or plastic pressing. The product normally will adhere to the mold during application, jiggering and pressing, and then shrinks rapidly and releases from the mold wall as it approaches the leatherhard state. It may then be further dried or removed for further completion such as appendage application, trimming, sponging, drying, etc. However spray buildup of wall may continue after release and also after removal from the mold, since once a stable wall is presented, whether it be a mold wall or a stable clay wall, additional buildup is not accompanied by severe pressure against the wall.

It will be understood that this invention contemplates the formation of the ware piece by impact spraying, that is to say, the ceramic material in finely divided form is projected against a wall and is caused to adhere thereto, the wall acting as a form by means of which the ware piece is at least in part shaped and from which the ware is releasable and removable. The degree of force with which the particles of ceramic material are thrown against the wall of the mold may vary, for instance, a highly adhesive mixture may not require the force necessary to amalgamate and bond a less adhesive mixture.

The ware matures in a much shorter interval than is customary. In case the ware is only once fired, the glaze coating may be sprayed onto the formed body as it travels along on a conveyor or the ware may be dipped into a glaze bath by hand or mechanically after which it is run through the kiln and fired. Twice fired ware will be bisque fired before the glaze is applied and the ware run through the glost kiln. Therefore, my invention comprehends a complete manufacturing precess commencing with the preparation of the raw materials to the fired, glazed product with the step of producing the body of the article being performed as described herein.

Having thus described my invention, what I claim is:

1. In the manufacture of jiggered pottery ware the method which comprises, charging an absorbent mold with clay by spray evaporating a liquid mixture of ceramic materials and recovering the solid constituents thereof on the forming surface of the mold, thereafter jiggering the material, drying and removing it from the mold and firing the same.

2. In the manufacture of jiggered pottery ware a method which comprises, charging an absorbent mold with clay by spray evaporating a liquid mixture of ceramic materials in the presence of a vacuum and recovering the solid constituents thereof on the forming surface of the mold, jiggering the material, drying and removing it from the mold and thereafter firing the same.

3. A method according to claim 1 wherein the spray evaporation process is sub-divided and the body of the article is built up by successive deposits of material.

4. In apparatus for feeding clay to molds in the manufacture of pottery, a spray evaporator including an atomizer for ceramic material for spraying a charge of ceramic material directly into or on a mold and a confining member adapted to co-operate with the atomizer to confine the spray to predetermined zones on the molding surface of the mold.

5. In apparatus for feeding clay to molds in the manufacture of pottery, a spray evaporating means including a spray mechanism and a desiccating chamber, and means for positioning molds at the open end of said desiccating chamber in position to receive the solid constituents of the ceramic mixture being spray evaporated.

6. In a clay feeder for delivering charges of clay to molds, a spray mechanism having at least one spray source provided with means for supplying clay thereto, a hood for co-operation with the mold, means for vacuumizing the hood, means for supplying heated air thereto, a mold support, and means for co-operating the mold support with said spray mechanism and said hood.

7. In a clay feeder for delivering charges of clay to molds, a spray evaporator including a spray mechanism comprising a plurality of spray sources each being regulable for directing the spray to various zones of the mold, means for supplying clay thereto, said spray mechanism being adapted to deposit a finely divided ceramic mixture on the mold and to build up areas of increased cross-section, means associated with at least one of said spray sources for baffling the spray in confining the same to a particular zone or zones, and a mold support.

8. In apparatus for manufacturing potteryware, in combination, a mold conveyor by means of which molds are presented in successive order to fabricating mechanism, one or more clay feeders comprising a spray mechanism for delivering charges of clay to said molds, means for applying heated air to said molds for drying the clay deposited thereon, means for recontouring the clay deposit, mold supports arranged adjacent to said feeding, heat applying and recontouring means, means for elevating and/or rotating said mold support, a source of clay supply, means for conducting clay to said feeding mechanism, means for varying the volume of clay fed to said molds, means for regulating the instant of initiation, duration and termination of the feeding operation and mechanism for repositioning said spray mechanism relative to said molds.

9. Apparatus for feeding clay to molds in the manufacture of pottery ware comprising a chambered spray evaporator with means for vacuumizing the spray chamber.

10. A method of manufacturing pottery ware which comprises, transporting a plurality of molds along a predetermined path and in one portion of the path spray evaporating a liquid mixture of ceramic materials the solid constituents of which are recovered on the molds and repeating the aforesaid operation at one or more positions until a body of requisite thickness is developed and in another portion of the path pressing the previously deposited material to further form and compact the same and in another portion of the path jiggering the pressed material and in another portion of the path drying said material and thereafter glazing and firing the material.

11. In combination with a pottery jiggering apparatus, means for feeding clay to jiggering molds comprising means for spray evaporating a liquid mixture of ceramic material.

12. In a machine for forming ceramic material, the combination of a feeder, a die and a profile, means for transporting molds successively therebetween, said feeder comprising a spray evaporator having a vacuum head adapted to cooperate with molds to form therewith a vacuumized chamber in which the ceramic material is spray evaporated.

13. In combination with a pottery forming machine, means for feeding clay to molds comprising a spray evaporating means including a spray mechanism and a desiccating chamber.

14. In the manufacture of jiggered pottery ware, the method comprises charging an absorbent mold with clay by spray evaporating a liquid mixture of ceramic materials in the presence of heat and recovering solid constituents thereof on the forming surface of the mold, jiggering the clay, drying and removing it from the surface of the mold and thereafter firing the same.

15. In combination with apparatus for advancing a line of pottern molds along a generally horizontal path wherein clay is formed on the molds into articles of pottery, a spray evaporator arranged above the general path of travel of the molds and adapted to feed clay charges to successive molds moving in said path, said spray evaporator including one or more clay discharge nozzles through which clay may be fed.

16. In combination with apparatus for advancing a line of pottery molds along a generally horizontal path wherein clay is formed on the molds into articles of pottery, a spray evaporator arranged above the general path of travel of the molds and adapted to feed clay to successive molds moving in said path and means for selectively controlling the volume of clay supplied to said spray evaporator.

17. In the feeding of clay to and the forming of clay on a succession of pottery molds, the method which consists in advancing a line of pottery molds along a generally horizontal path, charging the molds in successive order by spray evaporating a liquid mixture of ceramic materials and recovering the solid constituents thereof on the molds and thereafter pressing the material thus deposited on the mold, jiggering and drying it and then removing it from the mold.

18. In combination with apparatus for advancing a line of pottery molds along a generally horizontal path wherein clay is fed to the molds and formed into articles of pottery, a clay feeder arranged above the general path of travel of the molds comprising means for spray evaporating a liquid mixture of ceramic material and forming means also arranged above the general path of travel of the molds comprising means for pressing the clay.

19. In combination with apparatus for advancing a line of pottery molds along a generally horizontal path wherein clay is fed to the molds and formed into articles of pottery, means for charging the molds with clay comprising apparatus for spray evaporating a liquid mixture of ceramic materials arranged above the general path of travel of the molds and means for forming the material thus deposited on the molds comprising apparatus for pressing the clay and apparatus for jiggering the same.

20. In combination with apparatus for advancing a line of pottery molds along a generally horizontal path wherein clay is fed to the molds and formed into articles of pottery, means for feeding clay to the molds comprising apparatus for spray evaporating a liquid mixture of ceramic materials arranged above the general path of travel of the molds and jiggering means for forming the material thus deposited on the molds.

21. In combination with apparatus for advancing a line of pottery molds along a generally horizontal path wherein clay is fed to and formed on the molds into articles of pottery, means for feeding clay to molds comprising a plurality of spray evaporators arranged above the general path of travel of the molds and adapted selectively to feed clay to selected zones of the molding surface, conduits extending back to a source of clay supply and means for supplying clay under controlled pressure to said spray evaporators.

22. In combination with a pottery jiggering apparatus, means for feeding clay to jigger molds comprising means for spray evaporating a liquid mixture of ceramic materials and a die for pressing the spray evaporated material.

23. In combination in a pottery jiggering machine, a feeder comprising means for spray evaporating a liquid mixture of ceramic materials, a die for pressing the spray evaporated material and profiling means for jiggering the evaporated material.

WILLIAM J. MILLER.